(12) United States Patent
Gunnarsson et al.

(10) Patent No.: US 12,174,303 B2
(45) Date of Patent: Dec. 24, 2024

(54) METHODS FOR INDICATION OF REFERENCE STATION GNSS RTK INTEGER AMBIGUITY LEVEL

(71) Applicant: Telefonaktiebolaget LM Ericsson (publ), Stockholm (SE)

(72) Inventors: Fredrik Gunnarsson, Linköping (SE); Sara Modarres Razavi, Stockholm (SE); Ritesh Shreevastav, Upplands Väsby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 137 days.

(21) Appl. No.: 17/765,192

(22) PCT Filed: Oct. 2, 2020

(86) PCT No.: PCT/IB2020/059291
§ 371 (c)(1),
(2) Date: Mar. 30, 2022

(87) PCT Pub. No.: WO2021/064690
PCT Pub. Date: Apr. 8, 2021

(65) Prior Publication Data
US 2023/0003908 A1 Jan. 5, 2023

Related U.S. Application Data

(60) Provisional application No. 62/910,131, filed on Oct. 3, 2019.

(51) Int. Cl.
*G01S 19/44* (2010.01)
*G01S 5/00* (2006.01)
*G01S 19/06* (2010.01)

(52) U.S. Cl.
CPC ............ *G01S 19/44* (2013.01); *G01S 5/0018* (2013.01); *G01S 19/06* (2013.01)

(58) Field of Classification Search
CPC ......... G01S 19/44; G01S 5/0018; G01S 19/06
(Continued)

(56) References Cited

U.S. PATENT DOCUMENTS

| 10,775,510 B2* | 9/2020 | Agee ................ G01S 19/215 |
| 2010/0007555 A1* | 1/2010 | Ezal ........................ H01Q 25/00 |
| | | 342/417 |
| 2019/0324155 A1* | 10/2019 | Huang ................... G01S 19/04 |

FOREIGN PATENT DOCUMENTS

WO 2018/126869 A1 7/2018

OTHER PUBLICATIONS

3GPP TS 29.171 V15.3.0 (Sep. 2019) 3rd Generation Partnership Project; Technical Specification Group Core Network and Terminals; Location Services (LCS); LCS Application Protocol (LCS-AP) Between the Mobile Management Entity (MME) and Evolved Serving Mobile Location Centre (E-SMLC); SLs Interface (Release 15), consisting of 66 pages.

(Continued)

*Primary Examiner* — Bo Fan
(74) *Attorney, Agent, or Firm* — Weisberg I.P. Law, P.A.

(57) ABSTRACT

According to one aspect of the disclosure, a location node configured to communicate with a wireless device is provided. The location node includes processing circuitry configured to: receive spatial information; determine the wireless device relationship between a first reference station and a second reference station based at least in part on the spatial information; compare a first integer ambiguity level of the first reference station with a second integer ambiguity level of the second reference station, the second reference station corresponding to a current reference station of the wireless device; and transmit an indication of an applicability of the (Continued)

first integer ambiguity level of the first reference station to the second integer ambiguity level of the second reference station for position estimation, the indication being based on the comparison of the first integer ambiguity level with the second integer ambiguity level.

23 Claims, 14 Drawing Sheets

(58) Field of Classification Search
USPC .......... 342/352, 417, 447, 161, 357.59, 432
See application file for complete search history.

(56) References Cited

OTHER PUBLICATIONS

3GPP TS 29.172 V15.1.0 (Sep. 2019) 3rd Generation Partnership Project; Technical Specification Group Core Network and Terminals; Location Services (LCS); Evolved Packet Core (EPC) LCS Protocol (ELP) Between the Gateway Mobile Location Centre (GMLC) and the Mobile Management Entity (MME); SLg interface (Release 15), consisting of 43 pages.
3GPP TS 36.331 V15.7.0 (Sep. 2019) Technical Specification 3rd Generation Partnership Project; Technical Specification Group Radio Access Network; Evolved Universal Terrestrial Radio Access (E-UTRA); Radio Resource Control (RRC); Protocol specification (Release 15), consisting of 962 pages.
International Search Report and Written Opinion dated Dec. 23, 2020 issued in PCT Application No. PCT/IB2020/059291, consisting of 19 pages.
R2-1808748 (Late Resubmission of R2-1808110); 3GPP TSG-RAN WG2#101bis; Title: Transfer of Unicast Reference Station Ambiguity Level; Agenda Item: 9.8.2; Source: Ericsson; Document for: Discussion, Decision; Busan, Korea, May 21-25, 2018, consisting of 11 pages.
R2-1913424; 3GPP TSG-RAN WG2#107bis; Title: GNSS Integer Ambiguity Level Indications; Agenda Item: 6.8.2.2; Source: Ericsson; Document for: Discussion, Decision; Chongqing, China, Oct. 14-18, 2019, consisting of 5 pages.
R2-1806206; 3GPP TSG-RAN WG2 Meeting #10bis; Title: Notes of Session on Positioning Accuracy Enhancements for LTE; Source: Session Chair (Huawei); Sanya, China, Apr. 16-20, 2018, consisting of 18 pages.
3GPP TS 36.355 V15.4.0 (Jun. 2019); 3rd Generation Partnership Project; Technical Specification Group Radio Access Network; Evolved Universal Terrestrial Radio Access (E-UTRA); LTE Positioning Protocol (LPP) (Release 15), consisting of 224 pages.
3GPP TS 36.455 V15.2.1 (Jan. 2019); 3rd Generation Partnership Project; Technical Specification Group Radio Access Network; Evolved Universal Terrestrial Radio Access (E-UTRA); LTE Positioning Protocol A (LPPa) (Release 15), consisting of 84 pages.
3GPP TS 36.355 V15.5.0 (Sep. 2019); 3rd Generation Partnership Project; Technical Specification Group Radio Access Network; Evolved Universal Terrestrial Radio Access (E-UTRA); LTE Positioning Protocol (LPP) (Release 15), consisting of 224 pages.
3GPP TS 36.305 V15.4.0 (Jun. 2019); 3rd Generation Partnership Project; Technical Specification Group Radio Access Network; Evolved Universal Terrestrial Radio Access Network; (E-UTRAN); Stage 2 functional specification of User Equipment (UE) positioning in E-UTRAN (Release 15), consisting of 91 pages.
Written Opinion of the International Preliminary Examining Authority dated Sep. 14, 2021 issued in PCT Application No. PCT/IB2020/059291, consisting of 8 pages.
International Preliminary Report on Patentability dated Jan. 4, 2022 issued in PCT Application No. PCT/IB2020/059291, consisting of 13 pages.

* cited by examiner

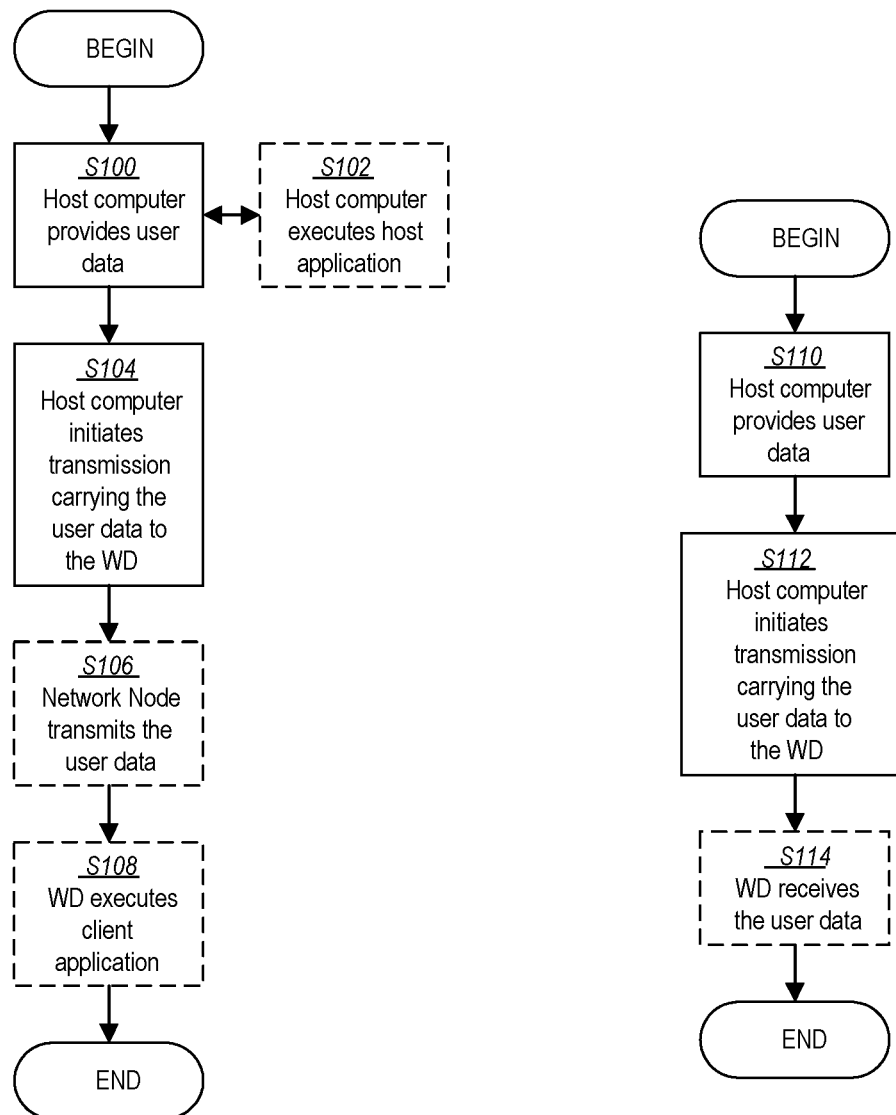

METHODS FOR INDICATION OF REFERENCE STATION GNSS RTK INTEGER AMBIGUITY LEVEL

CROSS-REFERENCE TO RELATED APPLICATIONS

This application is a Submission Under 35 U.S.C. § 371 for U.S. National Stage Patent Application of International Application No.: PCT/IB2020/059291, filed Oct. 2, 2020 entitled "METHODS FOR INDICATION OF REFERENCE STATION GNSS RTK INTEGER AMBIGUITY LEVEL," which claims priority to U.S. Provisional Application No. 62/910,131, filed Oct. 3, 2019, entitled "METHODS FOR INDICATION OF REFERENCE STATION GNSS RTK INTEGER AMBIGUITY LEVEL," the entireties of both of which are incorporated herein by reference.

TECHNICAL FIELD

The present disclosure relates to wireless communications, and in particular, to indication of reference station Global Navigation Satellite System (GNSS) Real Time Kinematics (RTK) integer ambiguity levels.

BACKGROUND

Positioning in the $3^{rd}$ Generation Partnership Project (3GPP) Long Term Evolution (LTE) standards-based wireless communication system is generally supported by the architecture in FIG. 1, with direct interactions between a wireless device (WD) and an evolved serving mobile location center (E-SMLC) server via the LTE Positioning Protocol (LPP). Moreover, there are also interactions between the location server and the base station (eNodeB) via the LPP, to some extent supported by interactions between the eNodeB and the WD via the Radio Resource Control (RRC) protocol.

The following positioning techniques are considered in LTE as set forth by the Third Generation Partnership Project (3GPP) Technical Standard (TS) 36.305 V15.4.0:

Enhanced Cell ID. Essentially cell ID information to associate the WD to the serving area of a serving cell, and then additional information to determine a finer granularity position.

Assisted GNSS. GNSS information retrieved by the WD, supported by assistance information provided to the WD from E-SMLC.

OTDOA (Observed Time Difference of Arrival). The WD estimates the time difference of reference signals from different base stations and sends to the E-SMLC for multilateration.

UTDOA (Uplink TDOA). The WD is requested to transmit a specific waveform that is detected by multiple location measurement units (e.g., eNBs) at known positions. These measurements are forwarded to E-SMLC for multilateration In 3GPP LTE Release 15 (Rel. 15) positioning, one objective is to provide support for Real Time Kinematics (RTK) GNSS positioning. It has been also discussed that both WD-based and WD-assisted GNSS RTK positioning be supported.

A reference station network (at a server, such as a NRTK (network RTK) server) gathers all observations and may interpolate to generate calculated observations at non-physical reference station positions. The served WDs obtains observations from one or more physical or non-physical reference stations. An example of a reference station network is shown in FIG. 2. A reference station may provide positioning information and integer ambiguity information to a wireless device and/or network node.

FIG. 3 shows a comparison of the carrier-phase and code measurements of satellite signals. As can be seen, the carrier frequency is hard to count because it is so uniform. Every cycle looks the same. The pseudo random code on the other hand is intentionally complex to make it easier to become distinguishable. The carrier phase measurements of a receiver are very accurate, but the number of integer wavelengths to the satellite is unknown. However, based on assistance data with observations, the WD can determine the integer.

Then, the WD obtains observations, associated to one or more reference station(s), and the WD uses the observations to determine satellite time and receiver position.

Navpedia provides the following generic description of the phase measurement, the integer ambiguity N and the error contributions:

$$\phi = \rho - I + Tr + c(b_{Rx} - b_{Sat}) + N\lambda + \varepsilon_\phi \quad (1)$$

where:
I is the signal path delay due to the ionosphere;
Tr is the signal path delay due to the troposphere;
$b_{Rx}$ is the receiver clock offset from the reference (GPS) time;
$b_{Sat}$ is the satellite clock offset from the reference (GPS) time;
c is the vacuum speed of light;
$\lambda$ is the carrier nominal wavelength;
N is the ambiguity of the carrier-phase (integer number);
$\varepsilon_\phi$ are the measurement noise components, including multipath and other effects;
$\rho$ is the geometrical range between the satellite and the receiver, computed as a function of the satellite ($x_{Sat}, y_{Sat}, z_{Sat}$) and
receiver ($x_{Rx}, y_{Rx}, z_{Rx}$) coordinates as:

$$\rho = \sqrt{(x_{Sat} - x_{Rx})^2 + (y_{Sat} - y_{Rx})^2 + (z_{Sat} - z_{Rx})^2}. \quad (2)$$

Receivers then form the double difference equation. For two receivers a and b making simultaneous measurements at the same nominal time to satellites 1 and 2, the double difference observable is:

$$\phi_a{}^{12} - \phi_b{}^{12} = \rho_a{}^{12} - \rho_b{}^{12} - I_a{}^{12} + I_b{}^{12} + Tr_a{}^{12} - Tr_b{}^{12} + \lambda(N_a{}^{12} - N_b{}^{12}) + \varepsilon_a{}^{12} - \varepsilon_b{}^{12} \quad (3)$$

where $$\emptyset_a{}^{12} = \emptyset_a{}^1 - \emptyset_a{}^2 \quad (4)$$

In practice, the superscripts 1 and 2 represent two different satellites, a is the WD, and b a reference station. With this double difference, several error terms cancel out, and the WD can compute the unknown integer $N_{ab}{}^{12} = N_a{}^{12} - N_b{}^{12}$. This is tedious and takes some initialization time. When the WD moves into the service area, the current reference station becomes distant, while a new reference station can become more attractive. Then the WD needs to reinitialize the integer ambiguity solution with the new reference station instead.

The initialization when changing reference station is time consuming and results in a period of poor accuracy. An alternative is to send observations associated to several reference stations to the WD, and the WD can initialize a new reference station before a current reference station becomes too distant. However, this multiplies the signaling costs of the observables.

SUMMARY

Some embodiments advantageously provide methods, systems, and apparatuses for indication of reference station Global Navigation Satellite System (GNSS) Real Time Kinematics (RTK) integer ambiguity level.

UE (WD)-based GNSS RTK positioning, where a WD obtains assistance data from a location server/network node to support positioning in the device is employed. The assistance data is generated based on observations from one or more reference. This is stations, where a reference station is a node with known position and known antenna configuration, and a GNSS receiver capable of measuring signals from one or more satellite systems, where the satellite systems comprise one or more satellites, and each satellite transmits one or more signals. A similar architecture is applicable for 3GPP New Radio (NR) as well as other communication networks.

According to one aspect of the disclosure, a location node configured to communicate with a wireless device is provided. The location node includes processing circuitry configured to: receive spatial information; determine the wireless device relationship between a first reference station and a second reference station based at least in part on the spatial information; compare a first integer ambiguity level of the first reference station with a second integer ambiguity level of the second reference station where the second reference station corresponds to a current reference station of the wireless device; and transmit an indication of an applicability of the first integer ambiguity level of the first reference station to the second integer ambiguity level of the second reference station for position estimation, the indication being based on the comparison of the first integer ambiguity level with the second integer ambiguity level.

According to one or more embodiments of this aspect, the indication indicates that the first integer ambiguity level of the first reference station is transferable to the second reference station. According to one or more embodiments of this aspect, the indication indicates that the first integer ambiguity level of the first reference station is not transferable to the second reference station. According to one or more embodiments of this aspect, the spatial information indicates a cell identifier.

According to one or more embodiments of this aspect, spatial information indicates the wireless device is monitoring a system information broadcast in the spatial region associated with a cell identifier. According to one or more embodiments of this aspect, the indication to the wireless device indicates for the wireless device to monitor real time kinematics, RTK, signaling from the second reference station instead of the first reference station. According to one or more embodiments of this aspect, the first reference station corresponds to a first node with a known first physical position and first antenna configuration that has a first global navigation satellite system receiver for measuring signals from at least one satellite, and where the second reference station corresponds to a second node with a known second physical position and second antenna configuration that has a second global navigation satellite system receiver for measuring signals from at least one satellite. According to one or more embodiments of this aspect, the indication is transmitted to a network node serving the wireless device for broadcasting to the wireless device.

According to another aspect of the disclosure, a wireless device configured to communicate with a location node is provided. The wireless device includes processing circuitry configured to: transmit spatial information, receive an indication of an applicability of a first integer ambiguity level of a first reference station to a second integer ambiguity level of a second reference station where the indication is based at least in part on the spatial information, and estimate a position of the wireless device based at least in part on the indication.

According to one or more embodiments of this aspect, the indication indicates that the first integer ambiguity level of the first reference station is transferable to the second reference station. According to one or more embodiments of this aspect, the indication indicates that the first integer ambiguity level of the first reference station is not transferable to the second reference station. According to one or more embodiments of this aspect, the spatial information indicates a cell identifier.

According to one or more embodiments of this aspect, the spatial information indicates the wireless device is monitoring a system information broadcast in a spatial region associated with a cell identifier. According to one or more embodiments of this aspect, the first reference station corresponds to a first node with a known first physical position and first antenna configuration that has a first global navigation satellite system receiver for measuring signals from at least one satellite, and where the second reference station corresponds to a second node with a known second physical position and second antenna configuration that has a second global navigation satellite system receiver for measuring signals from at least one satellite. According to one or more embodiments of this aspect, the processing circuitry is further configured to determine carrier phase of the second reference station, the estimate of the position being based at least in part on the determined carrier phase of the second reference station.

According to one or more embodiments of this aspect, the wireless device is reassigned from the first reference station to the second reference station. According to one or more embodiments of this aspect, the indication indicates for the wireless device to monitor real time kinematics, RTK, signaling from the second reference station instead of the first reference station. According to one or more embodiments of this aspect, the indication is received in a broadcast from a network node serving the wireless device.

According to another aspect of the disclosure, a method for a location node that is configured to communicate with a wireless device is provided. Spatial information is received. The wireless device relationship between a first reference station and a second reference station is determined based at least in part on the spatial information. A first integer ambiguity level of the first reference station is compared with a second integer ambiguity level of the second reference station where the second reference station corresponds to a current reference station of the wireless device. An indication of an applicability of the first integer ambiguity level of the first reference station to the second integer ambiguity level of the second reference station for position estimation is transmitted. The indication is based on the comparison of the first integer ambiguity level with the second integer ambiguity level.

According to one or more embodiments of this aspect, the indication indicates that the first integer ambiguity level of the first reference station is transferable to the second reference station. According to one or more embodiments of this aspect, the indication indicates that the first integer ambiguity level of the first reference station is not transferable to the second reference station. According to one or more embodiments of this aspect, the spatial information indicates a cell identifier.

According to one or more embodiments of this aspect, the spatial information indicates the wireless device is monitoring a system information broadcast in the spatial region associated with a cell identifier. According to one or more embodiments of this aspect, the indication to the wireless device indicates for the wireless device to monitor real time kinematics, RTK, signaling from the second reference station instead of the first reference station. According to one or more embodiments of this aspect, the first reference station corresponds to a first node with a known first physical position and first antenna configuration that has a first global navigation satellite system receiver for measuring signals from at least one satellite, and where the second reference station corresponds to a second node with a known second physical position and second antenna configuration that has a second global navigation satellite system receiver for measuring signals from at least one satellite. According to one or more embodiments of this aspect, the indication is transmitted to a network node serving the wireless device for broadcasting to the wireless device.

According to another aspect of the disclosure, a method for a wireless device that is configured to communicate with a location node is provided. Spatial information is transmitted. An indication of an applicability of a first integer ambiguity level of a first reference station to a second integer ambiguity level of a second reference station is received where the indication is based at least in part on the spatial information. A position of the wireless device is estimated based at least in part on the indication.

According to one or more embodiments of this aspect, the indication indicates that the first integer ambiguity level of the first reference station is transferable to the second reference station. According to one or more embodiments of this aspect, the indication indicates that the first integer ambiguity level of the first reference station is not transferable to the second reference station. According to one or more embodiments of this aspect, the spatial information indicates a cell identifier.

According to one or more embodiments of this aspect, the spatial information indicates the wireless device is monitoring a system information broadcast in a spatial region associated with a cell identifier. According to one or more embodiments of this aspect, the first reference station corresponds to a first node with a known first physical position and first antenna configuration that has a first global navigation satellite system receiver for measuring signals from at least one satellite, and where the second reference station corresponds to a second node with a known second physical position and second antenna configuration that has a second global navigation satellite system receiver for measuring signals from at least one satellite. According to one or more embodiments of this aspect, carrier phase of the second reference station is determined where the estimate of the position is based at least in part on the determined carrier phase of the second reference station.

According to one or more embodiments of this aspect, the wireless device is reassigned from the first reference station to the second reference station. According to one or more embodiments of this aspect, the indication indicates for the wireless device to monitor real time kinematics, RTK, signaling from the second reference station instead of the first reference station. According to one or more embodiments of this aspect, the indication is received in a broadcast from a network node serving the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for executing a client application at a wireless device according to some embodiments of the present disclosure;

FIG. 7 is a flowchart illustrating exemplary methods implemented in a communication system including a host computer, a network node and a wireless device for receiving user data at a wireless device according to some embodiments of the present disclosure;

DETAILED DESCRIPTION

Figure 1:
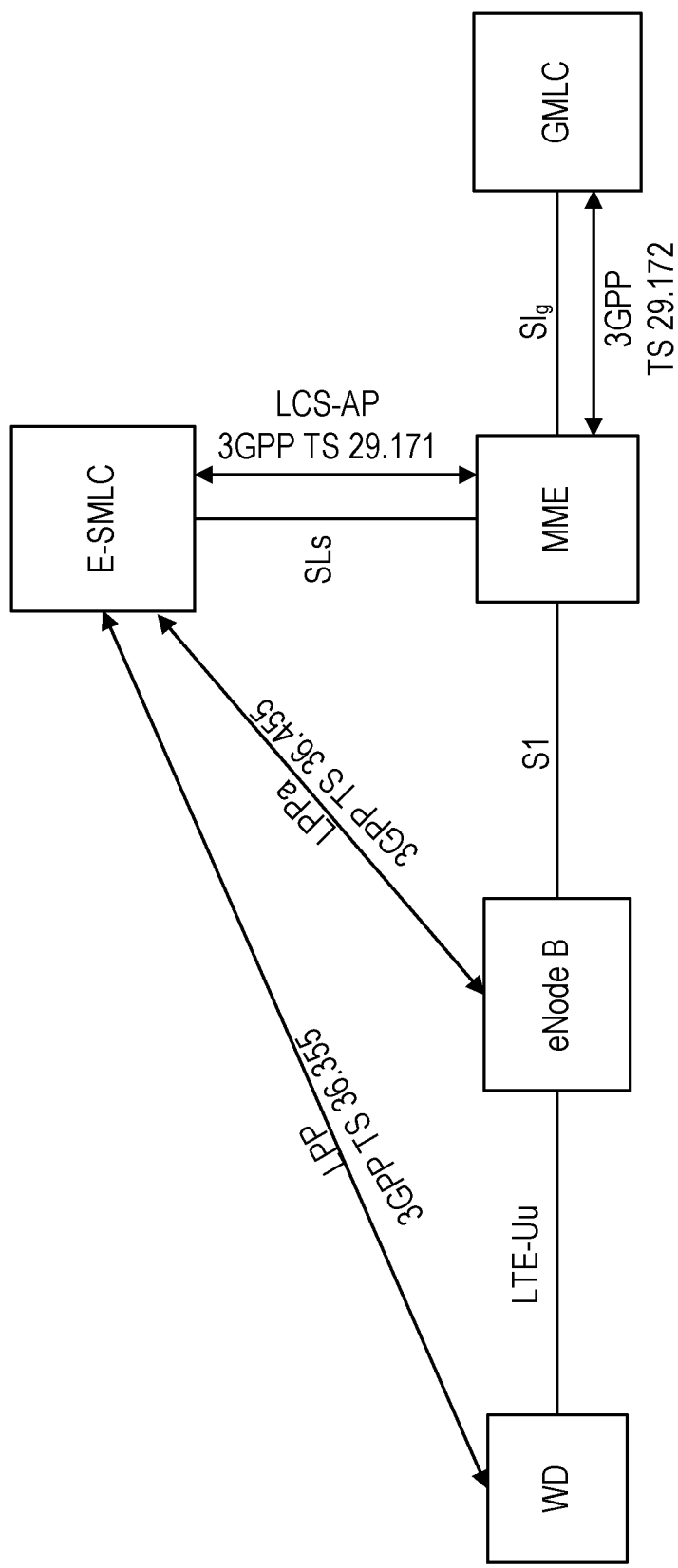
FIG. 1 illustrates an example LTE architecture.

Before describing in detail exemplary embodiments, it is noted that the embodiments reside primarily in combinations of apparatus components and processing steps related to indication of reference station Global Navigation Satellite System (GNSS) Real Time Kinematics (RTK) integer ambiguity levels. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may inter-operate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU), Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices. As used herein, an "ambiguity level" may include a level of uncertainty in determination of a number for cycles of the carrier from a reference station to a WD.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

A method, system and apparatus for indication of reference station Global Navigation Satellite System (GNSS) Real Time Kinematics (RTK) integer ambiguity levels are disclosed. According to one aspect, a network node is configured to receive spatial information from a wireless device (WD). The network node is further configured to determine, based at least in part on the spatial information, whether the WD is to be configured to obtain RTK data from a subsequent reference station that is different from a current reference station providing RTK data to the WD. The network node is further configured to analyze an integer ambiguity level of the subsequent reference station and the current reference station and transmit an indication of whether the WD is to use an integer ambiguity level for the subsequent reference station that is the same as an integer ambiguity level for the current reference station.

Figure 4:
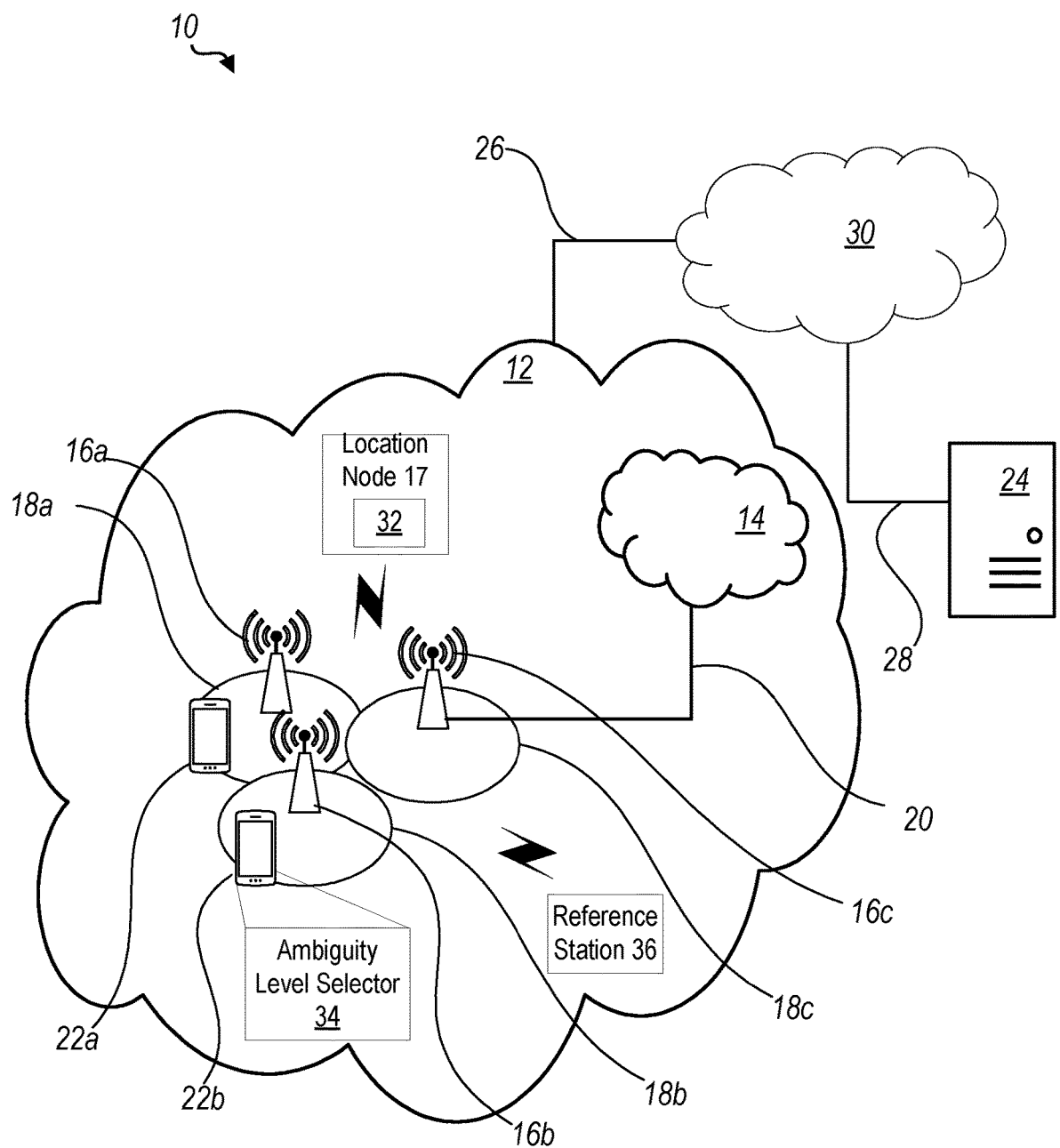
FIG. 4 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 4 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, and at least one location node 17 (referred to collectively as location node 17). Each of the plurality of network nodes 16 define a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. In addition to WDs 22 and network nodes 16, there is at least one reference station 36 in communication with the WDs 22 and network nodes 16. The reference station 36 may be configured to provide positioning information and information for determining an integer ambiguity level.

Location node 17 may, in some embodiments, be configured to communicate with WD 22 and/or network nodes 16 via one or more positioning protocols such as LPPa TS 36.455 V15.2.1 and LPP TS 36.355 V15.4.0, as illustrated in FIG. 1. In one or more embodiments, location node 17 is a location server or E-SMLC.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 4 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A location node 17 is configured to include an ambiguity indication unit 32 which is configured to determine, based at least in part on the spatial information, whether the WD is to be configured to obtain real time kinematic (RTK) data from a subsequent reference station that is different from a current reference station providing RTK data to the WD. A wireless device 22 is configured to include an ambiguity level selector 34 which is configured to select an integer ambiguity level based on the indication.

Example implementations, in accordance with an embodiment, of the WD 22, network node 16, location server 17 and host computer 24 discussed in the preceding paragraphs will now be described with reference to FIG. 5. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include an ambiguity level selector 34 which is configured to select an integer ambiguity level based on the indication.

The communication system 10 further includes a location node 17 provided in a communication system 10 and includes hardware 94 enabling it to communicate with WD 22 and/or network node 16. The hardware 94 may include a communication interface 96 for setting up and maintaining a wired or wireless connection with an interface of a different communication device of the communication system 10 such a host computer 24, as well as a radio interface 98 for communicating at least a wireless connection 64 with a WD 22 and/or network node 16. The radio interface 98 may be formed as or may include, for example, one or more RF transmitters, one or more RF receivers, and/or one or more RF transceivers.

In the embodiment shown, the hardware 94 of the location node 17 further includes processing circuitry 100. The processing circuitry 100 may include a processor 102 and a memory 104. In particular, in addition to or instead of a processor, such as a central processing unit, and memory, the processing circuitry 100 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 102 may be configured to access (e.g., write to and/or read from) the memory 104, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the location node 17 further has software 106 stored internally in, for example, memory 104, or stored in external memory (e.g., database, storage array, network storage device, etc.) accessible by the location node 17 via an external connection. The software 106 may be executable by the processing circuitry 100. The processing circuitry 100 may be configured to control any of the methods and/or processes described herein and/or to cause such methods, and/or processes to be performed, e.g., by location node 17. Processor 102 corresponds to one or more processors 102 for performing location node 17 functions described herein. The memory 104 is configured to store data, programmatic software code and/or other information described herein. In some embodiments, the software 106 may include instructions that, when executed by the processor 102 and/or processing circuitry 100, causes the processor 102 and/or processing circuitry 100 to perform the processes described herein with respect to location node 17. For example, processing circuitry 100 of the location node 17 may include ambiguity indication unit 32 which is configured to determine, based at least in part on the spatial information, whether the WD 22 is to be configured to obtain real time kinematic (RTK) data from a subsequent reference station that is different from a current reference station 36 providing RTK data to the WD.

Reference station 36 is in communication with the WDs 22 and network nodes 16. The reference station 36 may provide positioning information and information for determining an integer ambiguity level.

Figure 2:
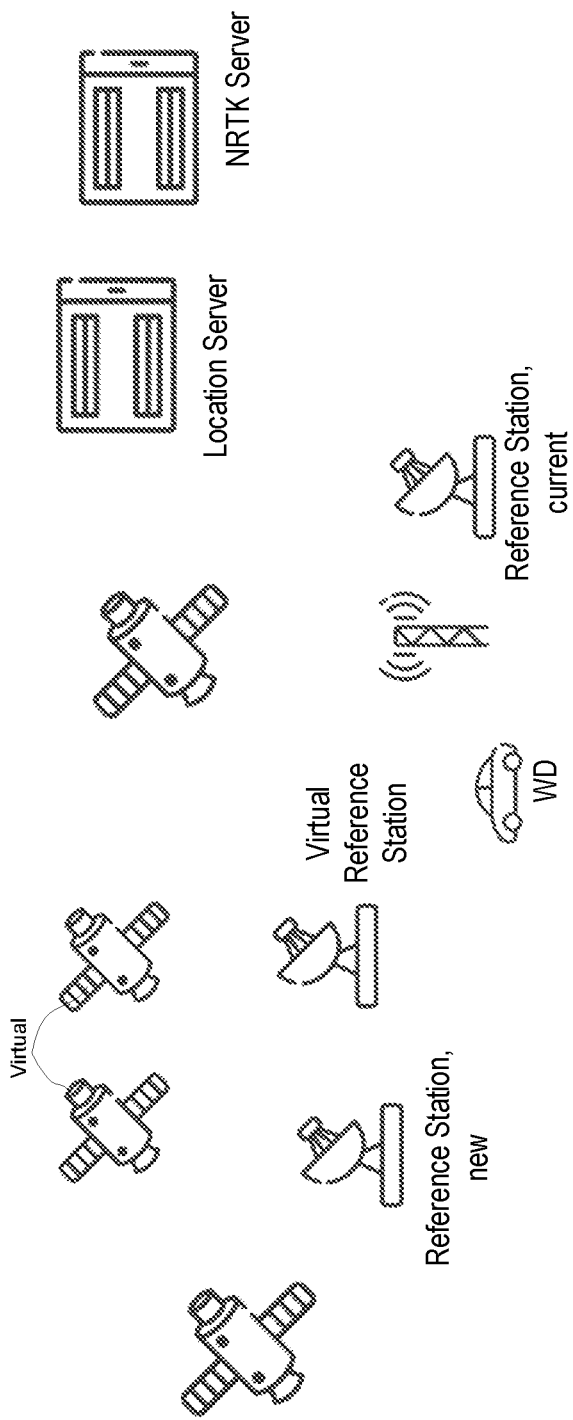
FIG. 2 illustrates an example of a reference station network.
Figure 3:
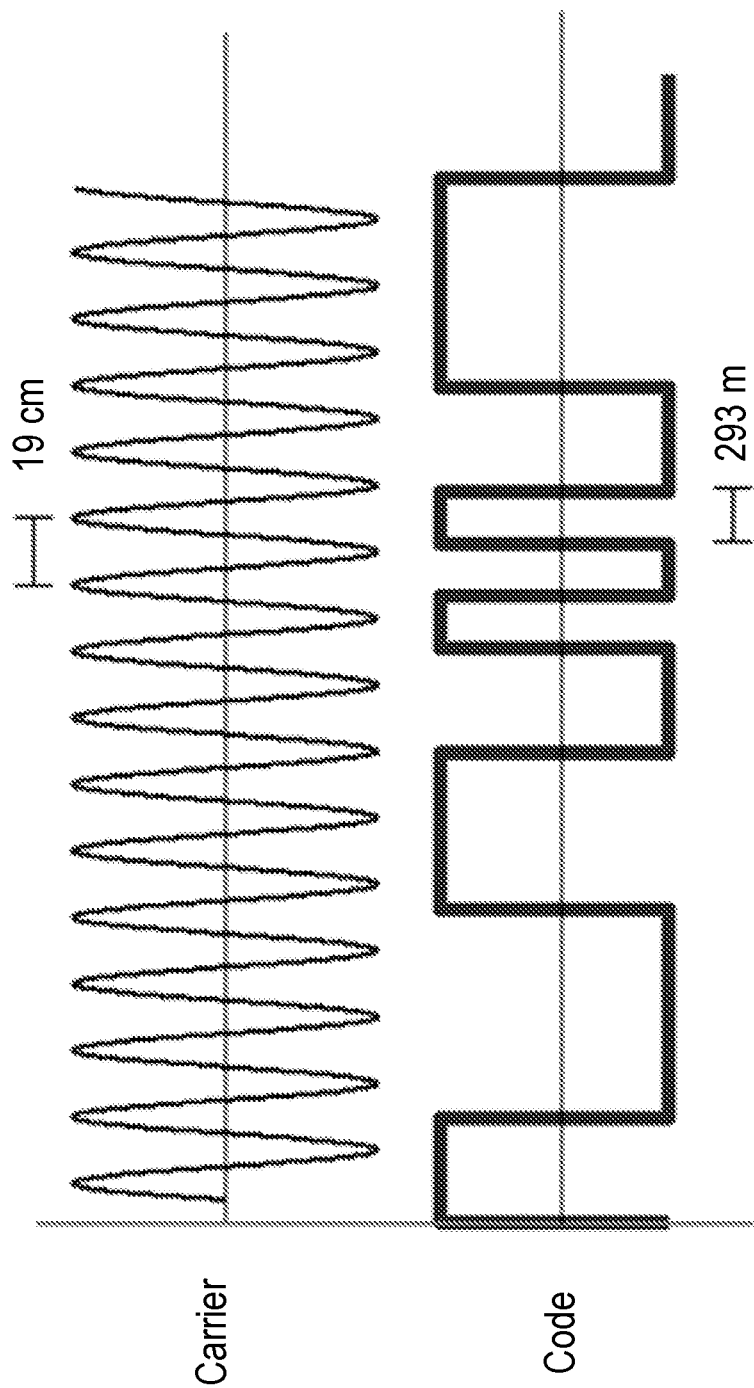
FIG. 3 illustrates a carrier and a code.

In some embodiments, the inner workings of the network node 16, location node 17, WD 22, and host computer 24 may be as shown in FIG. 2 and independently, the surrounding network topology may be that of FIG. 4.

Figure 5:
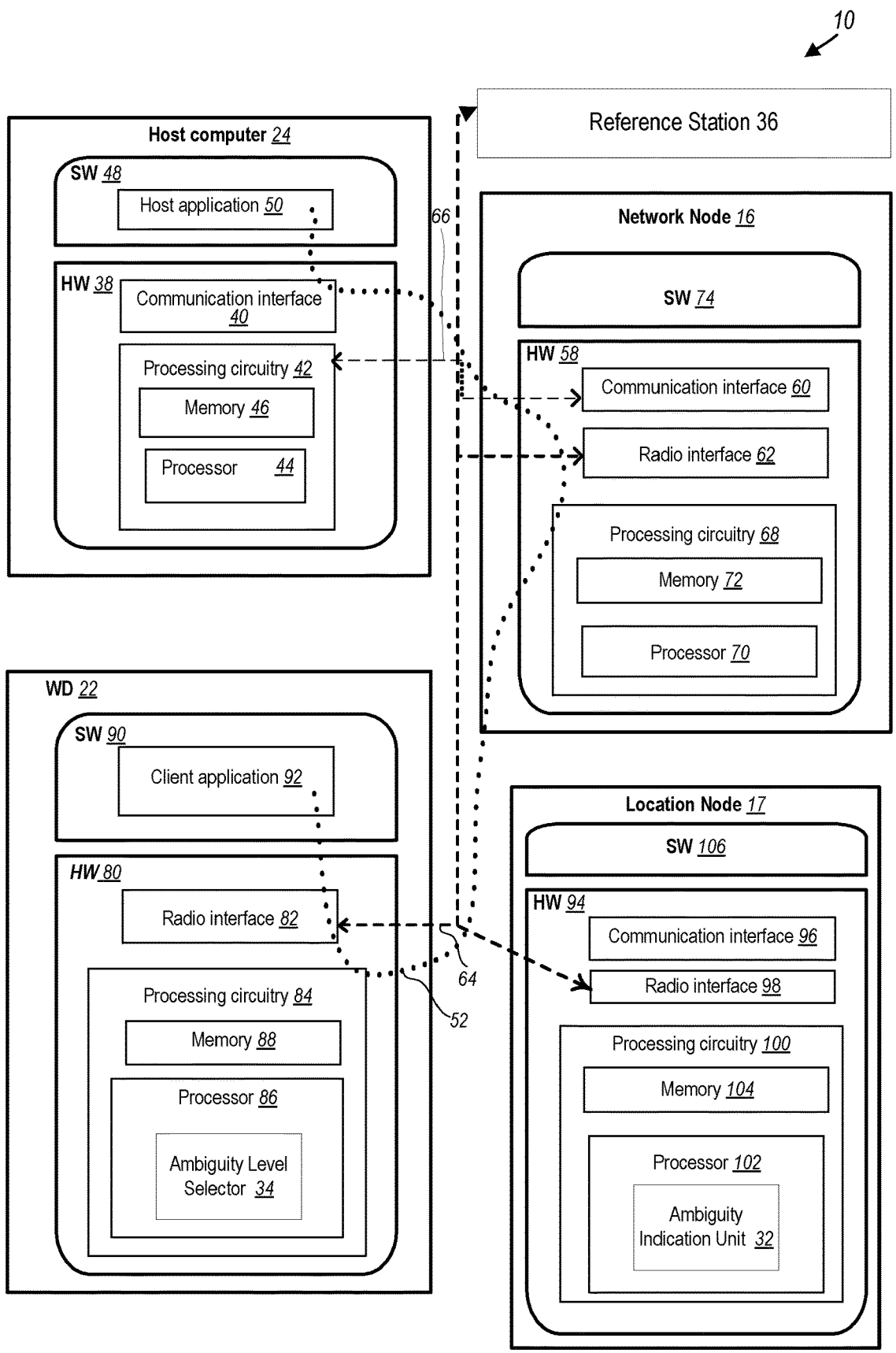
FIG. 5 is a block diagram of a host computer communicating via a network node with a wireless device over an at least partially wireless connection according to some embodiments of the present disclosure.

In FIG. 5, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 4 and 5 show various "units" such as ambiguity indication unit 32, and ambiguity level selector 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 6 is a flowchart illustrating an exemplary method implemented in a communication system, such as, for example, the communication system of FIGS. 4 and 5, in accordance with one embodiment. The communication system may include a host computer 24, a network node 16 and a WD 22, which may be those described with reference to FIG. 5. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 7 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 8:
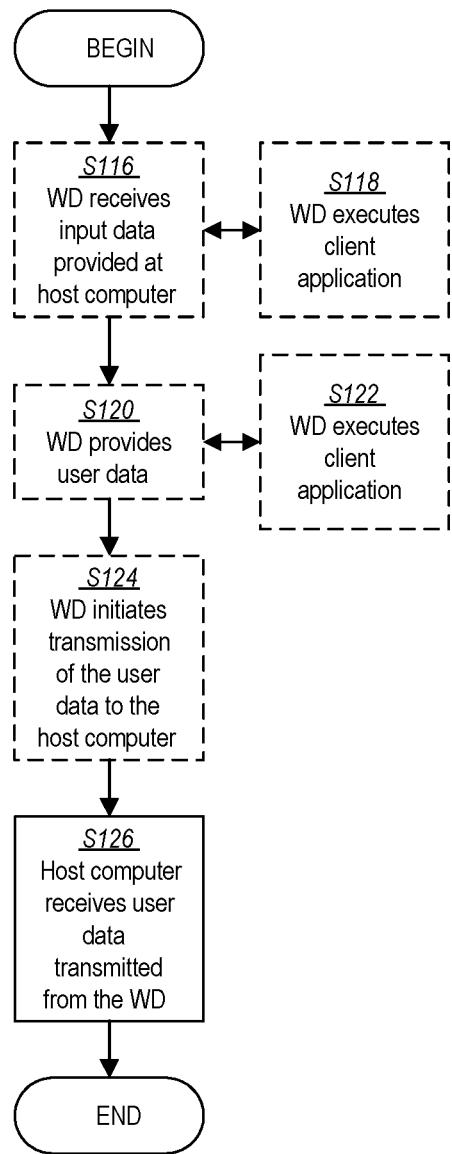
FIG. 8 is a flowchart illustrating exemplary methods implemented in a communication system including a host computer, a network node and a wireless device for receiving user data from the wireless device at a host computer according to some embodiments of the present disclosure.

FIG. 8 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally, or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 9:
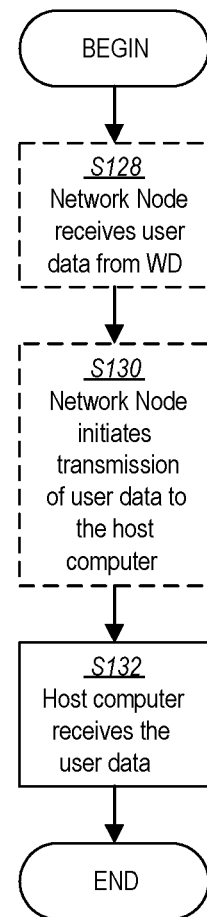
FIG. 9 is a flowchart illustrating exemplary methods implemented in a communication system including a host computer, a network node and a wireless device for receiving user data at a host computer according to some embodiments of the present disclosure.

FIG. 9 is a flowchart illustrating an exemplary method implemented in a communication system, such as, for example, the communication system of FIG. 4, in accordance with one embodiment. The communication system may include a host computer 24, a network node 16 and a WD 22, which may be those described with reference to FIGS. 4 and 5. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 10:
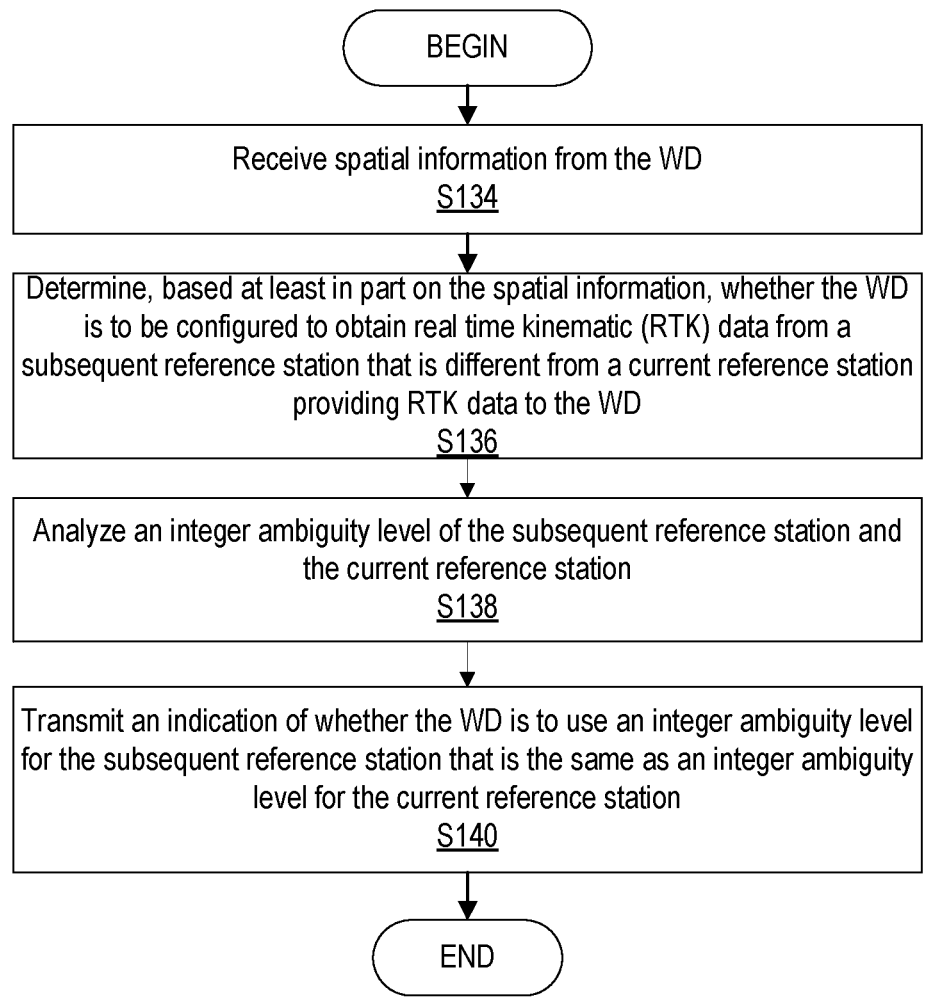
FIG. 10 is a flowchart of an example process in a network node according to the principles of the disclosure.

FIG. 10 is a flowchart of an example process in a location node 17 for resolving potential integer ambiguity. One or more blocks described herein may be performed by one or more elements of location node 17 such as by one or more of processing circuitry 100 (including the ambiguity indication unit 32), processor 102, radio interface 98 and/or communication interface 96. Location node 17 such as via processing circuitry 100 and/or processor 102 and/or radio interface 98 and/or communication interface 96 is configured to receive spatial information from the WD 22 (Block S134). The process further includes determining, based at least in part on the spatial information, whether the WD 22 is to be configured to obtain real time kinematic (RTK) data from a subsequent reference station 36 that is different from a current reference station 36 providing RTK data to the WD 22 (Block S136). The process also includes analyzing an integer ambiguity level of the subsequent reference station 36 and the current reference station 36 (Block S138). The process further includes transmitting an indication of whether the WD 22 is to use an integer ambiguity level for the subsequent reference station 36 that is the same as an integer ambiguity level for the current reference station 36 (Block S140).

Figure 11:
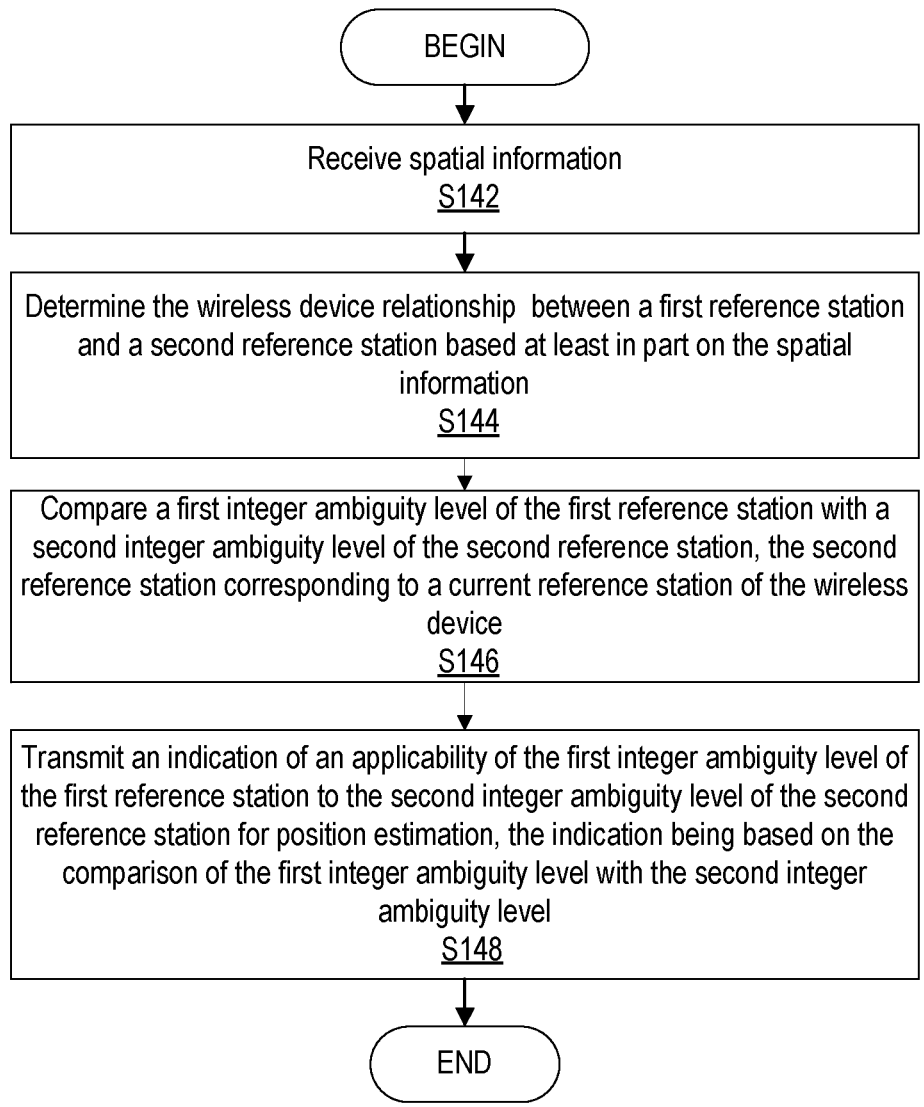
FIG. 11 is a flowchart of another example process in a network node according to the principles of the disclosure.

FIG. 11 is a flowchart of an example process in a location node 17 for resolving potential integer ambiguity. One or more blocks described herein may be performed by one or more elements of location node 17 such as by one or more of processing circuitry 100 (including the ambiguity indication unit 32), processor 102, radio interface 98 and/or communication interface 96. Location node 17 such as via processing circuitry 100 and/or processor 102 and/or radio interface 98 and/or communication interface 96 is configured to receive (Block S142) spatial information, as described herein. Location node 17 such as via processing circuitry 100 and/or processor 102 and/or radio interface 98 and/or communication interface 96 is configured to determine (Block S144) the wireless device 22 relationship between a first reference station 36 and a second reference station 36 based at least in part on the spatial information, as described herein.

Location node 17 such as via processing circuitry 100 and/or processor 102 and/or radio interface 98 and/or communication interface 96 is configured to compare (Block S146) a first integer ambiguity level of the first reference station 36 with a second integer ambiguity level of the second reference station 36 where the second reference station 36 corresponds to a current reference station 36 of the wireless device 22, as described herein. Location node 17 such as via processing circuitry 100 and/or processor 102 and/or radio interface 98 and/or communication interface 96 is configured to transmit (Block S148) an indication of an applicability of the first integer ambiguity level of the first reference station 36 to the second integer ambiguity level of the second reference station 36 for position estimation where the indication is based on the comparison of the first integer ambiguity level with the second integer ambiguity level, as described herein.

According to one or more embodiments, the indication indicates that the first integer ambiguity level of the first reference station 36 is transferable to the second reference station 36. According to one or more embodiments, the indication indicates that the first integer ambiguity level of the first reference station 36 is not transferable to the second reference station 36. According to one or more embodiments, the spatial information indicates a cell identifier.

According to one or more embodiments, spatial information indicates the wireless device 22 is monitoring a system information broadcast (SIB) in the spatial region associated with a cell identifier. According to one or more embodiments, the indication to the wireless device 22 indicates for the wireless device 22 to monitor real time kinematics, RTK, signaling from the second reference station 36 instead of the first reference station 36. According to one or more embodiments, the first reference station 36 corresponds to a first node with a known first physical position and first antenna configuration that has a first global navigation satellite system receiver for measuring signals from at least one satellite, and the second reference station 36 corresponds to a second node with a known second physical position and second antenna configuration that has a second global navigation satellite system receiver for measuring signals from at least one satellite. According to one or more embodiments, the indication is transmitted to a network node 16 serving the wireless device 22 for broadcasting to the wireless device 22.

Figure 12:
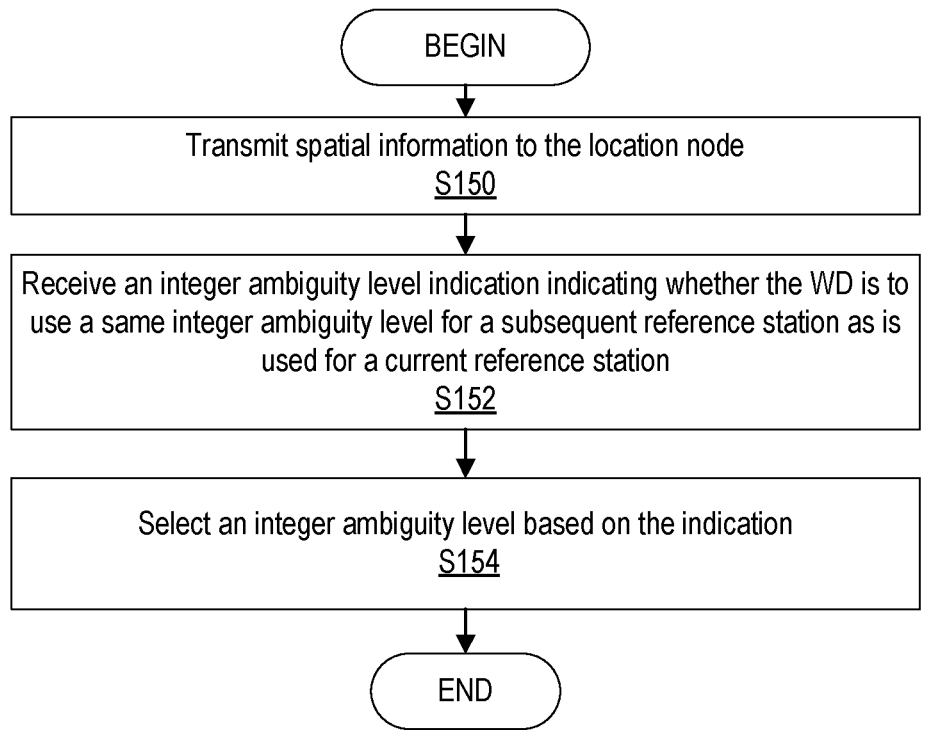
FIG. 12 is a flowchart of an example process in a wireless device according to the principles of the disclosure.

FIG. 12 is a flowchart of an exemplary process in a wireless device 22 according to some embodiments of the present disclosure. One or more blocks described herein may be performed by one or more elements of wireless device 22 such as by one or more of processing circuitry 84 (including the ambiguity level selector 34), processor 86, radio interface 82 and/or communication interface 60. Wireless device 22 such as via processing circuitry 84 and/or processor 86 and/or radio interface 82 is configured to transmit spatial information to the location node 17 (Block S150). The process also includes receiving an integer ambiguity level indication indicating whether the WD 22 is to use a same integer ambiguity level for a subsequent reference station 36 as is used for a current reference station 36 (Block S152). The process further includes selecting an integer ambiguity level based on the indication (Block S154).

Figure 13:
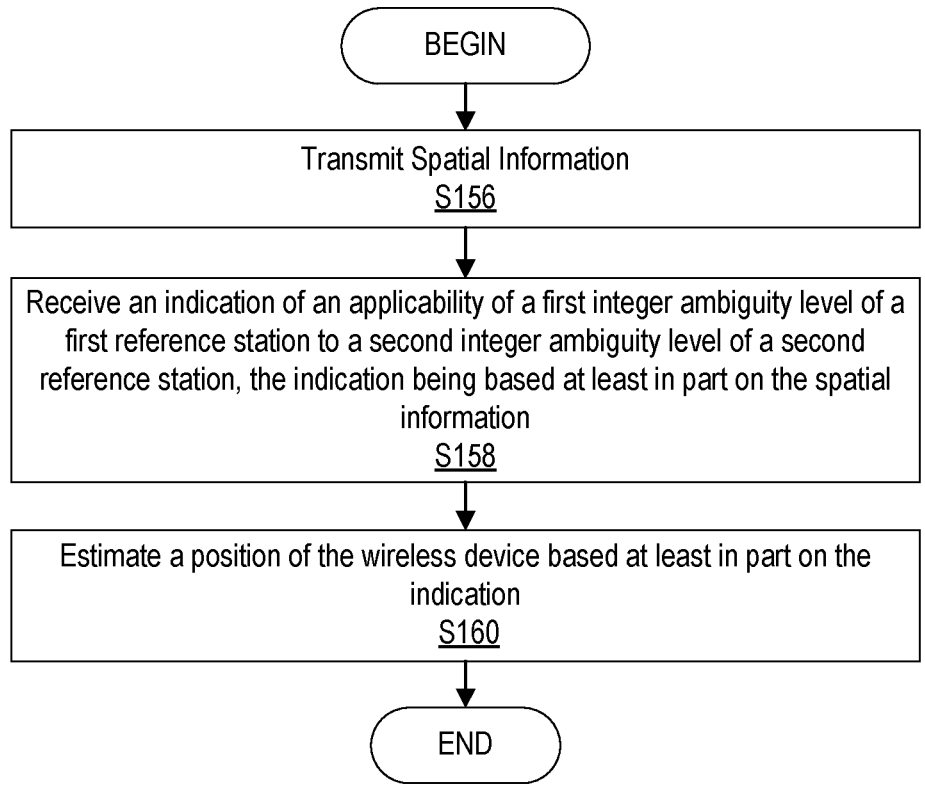
FIG. 13 is a flowchart of another example process in a wireless device according to the principles of the disclosure.

FIG. 13 is a flowchart of an exemplary process in a wireless device 22 according to some embodiments of the present disclosure. One or more blocks described herein may be performed by one or more elements of wireless device 22 such as by one or more of processing circuitry 84 (including the ambiguity level selector 34), processor 86, radio interface 82 and/or communication interface 60. Wireless device 22 such as via processing circuitry 84 and/or processor 86 and/or radio interface 82 is configured to transmit (Block S156) spatial information, as described herein. Wireless device 22 such as via processing circuitry 84 and/or processor 86 and/or radio interface 82 is configured to receive (Block S158) an indication of an applicability of a first integer ambiguity level of a first reference station to a second integer ambiguity level of a second reference station where the indication is based at least in part on the spatial information, as described herein. Wireless device 22 such as via processing circuitry 84 and/or processor 86 and/or radio interface 82 is configured to estimate (Block S160) a position of the wireless device based at least in part on the indication, as described herein.

According to one or more embodiments, the indication indicates that the first integer ambiguity level of the first reference station 36 is transferable to the second reference station 36. According to one or more embodiments, the indication indicates that the first integer ambiguity level of the first reference station 36 is not transferable to the second reference station 36. According to one or more embodiments, the spatial information indicates a cell identifier.

According to one or more embodiments, the spatial information indicates the wireless device 22 is monitoring a system information broadcast in a spatial region associated with a cell identifier. According to one or more embodiments, the first reference station 36 corresponds to a first node with a known first physical position and first antenna configuration that has a first global navigation satellite system receiver for measuring signals from at least one satellite, and the second reference station corresponds to a second node with a known second physical position and second antenna configuration that has a second global navigation satellite system receiver for measuring signals from at least one satellite. According to one or more embodiments, the processing circuitry 84 is further configured to determine carrier phase of the second reference station, the estimate of the position being based at least in part on the determined carrier phase of the second reference station.

According to one or more embodiments, the wireless device 22 is reassigned from the first reference station 36 to the second reference station 36. According to one or more embodiments, the indication indicates for the wireless device 22 to monitor real time kinematics, RTK, signaling from the second reference station 36 instead of the first reference station 36. According to one or more embodiments, the indication is received in a broadcast from a network node 16 serving the wireless device 22.

Having described the general process flow of arrangements of the disclosure and having provided examples of hardware and software arrangements for implementing the processes and functions of the disclosure, the sections below provide details and examples of arrangements for indication of reference station 36 Global Navigation Satellite System (GNSS) Real Time Kinematics (RTK) integer ambiguity level.

Figure 14:
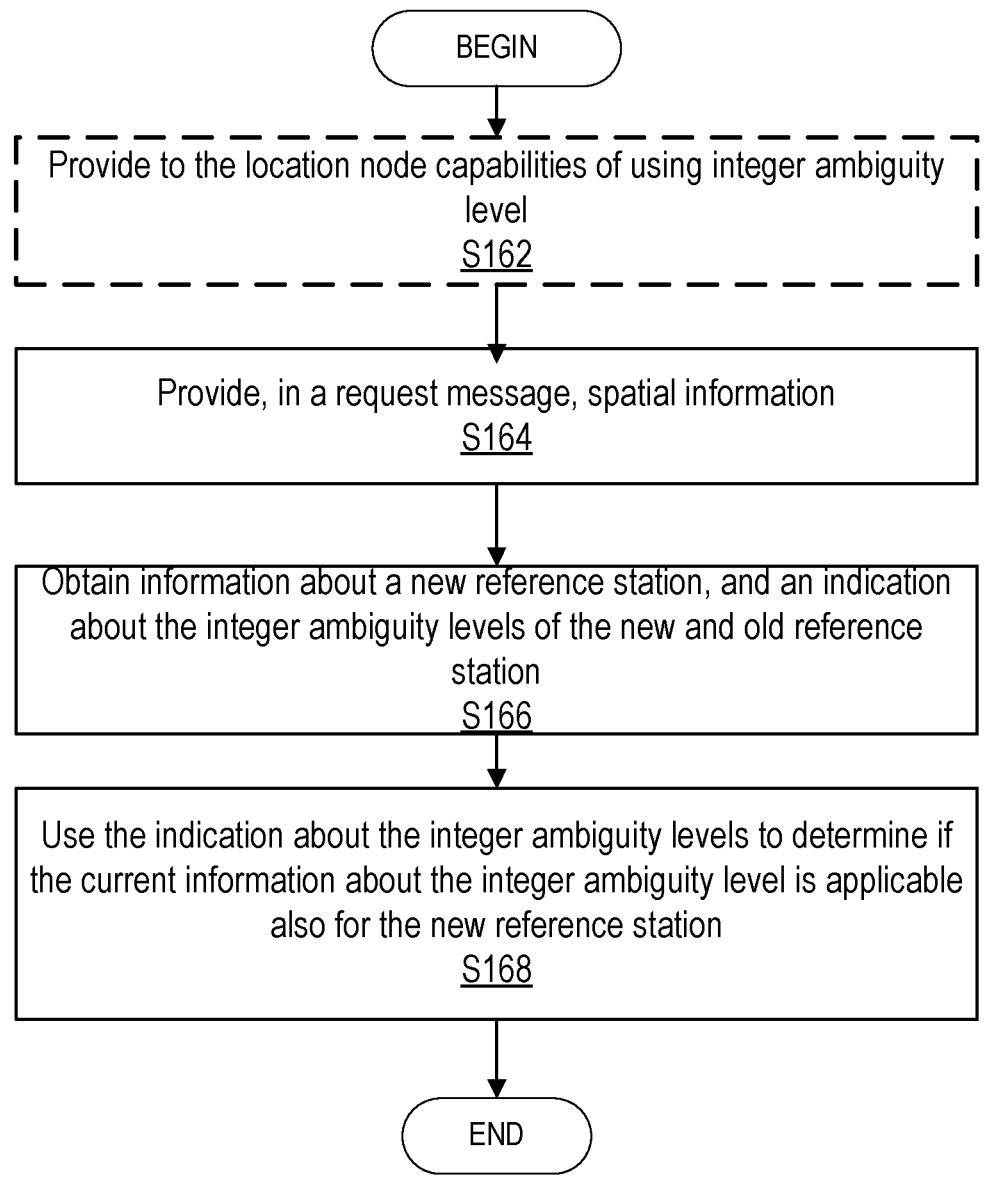
FIG. 14 is flowchart of an exemplary process in a WD for obtaining integer ambiguity information.

FIG. 14 illustrates the steps of some embodiments from the device (UE) perspective. The WD 22 optionally provides, via for example processing circuitry 84, to the location node 17 a capability (Block S162) about support for an integer ambiguity level indication. The WD 22 optionally provides spatial information in a request message (Block S164) to a location node 17. The spatial information can be logical such as a cell ID. The request message can also be implicit, for example when the WD 22 monitors GNSS RTK via broadcast, and switches from monitoring one cell to monitoring a new cell, where the change of cell implies a change in what system information broadcast that is monitored.

In cases where the current and new cells broadcast data from a current and new reference station 36 respectively, this is seen as a change of reference station 36, i.e., the relationship between a first reference station 36 (i.e., current) and a second reference station 36 (i.e., new) is determined (Block S166). In addition, the location node 17 may provide an integer ambiguity level indicator that indicates whether the new reference station 36 is at the same integer ambiguity level as the old reference station 36 or not. Based on the indicator, the WD 22 can determine if the integer ambiguity solution associated with the current reference station 36 can be transferred to an integer ambiguity solution associated with a new reference station 36 (Block S168). If so, the WD 22 uses the integer ambiguity solution associated to the new reference station 36 together with carrier phase observations from the new reference station, to estimate its position accurately.

Figure 15:
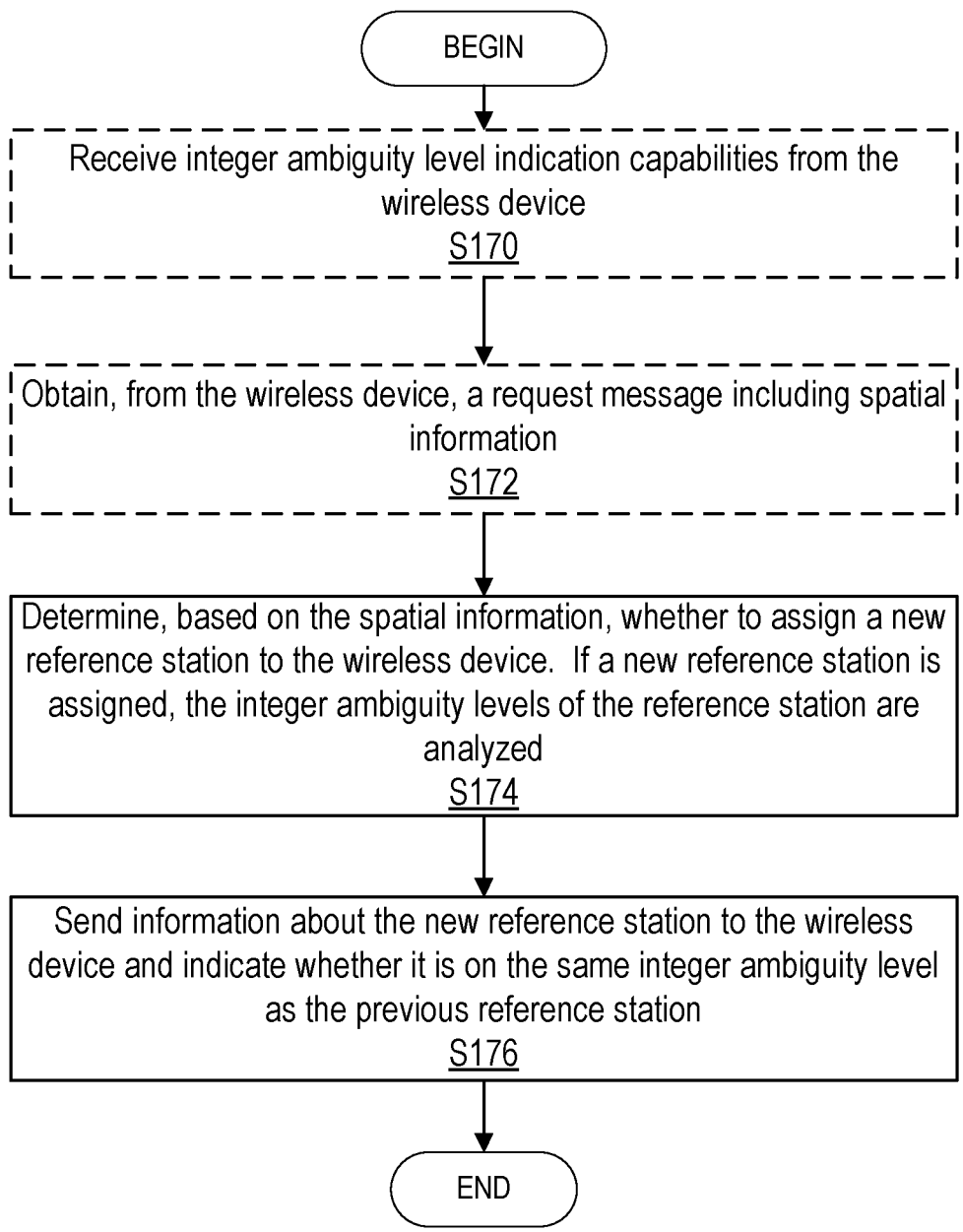
FIG. 15 is a flowchart of an exemplary process in a network node for resolving integer ambiguity.

FIG. 15 illustrates the basic for resolving integer ambiguity from the location node 17 perspective. Optionally, the location node 17 receives, via the radio interface 98, the supported integer ambiguity level indication capabilities from the WD 22 (Block S170). The location node 17 obtains a request message that includes spatial information such as a cell ID from the WD 22 (Block S172). The location node 17 uses the spatial information to determine if the WD 22 should obtain RTK data from a different reference station 36 than its current reference station. If the reference station 36 will be changed, the location node 17 analyzes the integer ambiguity levels of the current and new reference stations (Block S174). The location node 17 sends information about the new reference station 36 to the WD 22 (Block S176) and includes an indication about whether the integer ambiguity level is the same as the old reference station.

Figure 16:
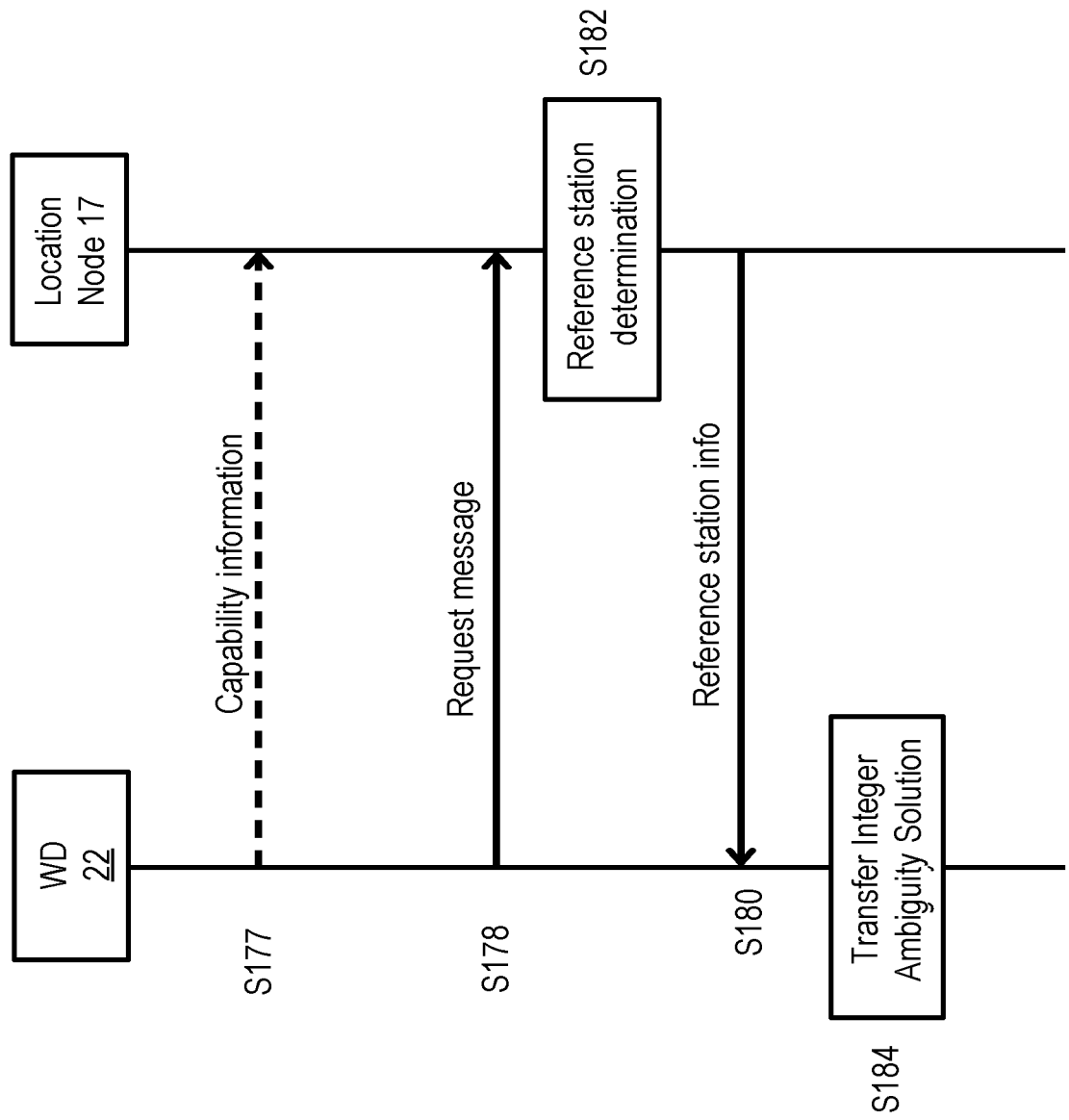
FIG. 16 illustrates signaling between a network node and a UE.

FIG. 16 provides a signaling chart that summarizes steps indicated above. The WD 22 optionally provides, via for example processing circuitry 84, to the location node 17 a capability (S177) about support for an integer ambiguity level indication. The WD optionally provides spatial information in a request message (S178) to a location node 17. The spatial information can be logical such as a cell ID. The request message can also be implicit, for example when the WD 22 monitors GNSS RTK via broadcast, and switches from monitoring one cell to a new cell, where the change of cell implies a change in what system information broadcast is monitored, in the case the current and new cells broadcast data from a current and new reference station, respectively.

The location node 17 may use the spatial information to determine if the WD 22 should obtain RTK data from a different reference station 36 than its current reference station. If the reference station 36 will be changed, the location node 17 may analyze the integer ambiguity levels of the current and new reference stations (Block S180). The location node 17 may send information about the new reference station 36 to the WD (Block S182) and includes an indication about whether the integer ambiguity level is the same as the old reference station 36 or not. Based on the indicator, the WD 22 can determine if the integer ambiguity solution associated to the current reference station 36 can be transferred to an integer ambiguity solution associated to a new reference station 36 (Block S184). If so, the WD may use the integer ambiguity solution associated to the new reference station 36 together with carrier phase observations from the new reference station, to estimate its position accurately.

An alternative is to provide some additional information to the WD 22 when the location server swaps the reference station 36 from which the observation stems from. For two receivers a and h making simultaneous measurements at the same nominal time to satellites 1 and 2, the double difference observable is:

$$\phi_a^{12} - \phi_b^{12} = \rho_a^{12} - \rho_b^{12} - I_a^{12} + I_b^{12} + Tr_a^{12} - Tr_b^{12} + \lambda(N_a^{12} - N_b^{12}) + \varepsilon_a^{12} - \varepsilon_b^{12} \quad (3)$$

where $$\emptyset_a^{12} = \emptyset_a^1 - \emptyset_a^2 \quad (4)$$

The integer ambiguity solution is solved for $N_{ab}^{12}$ etc., where $$N_{ab}^{12} = (N_a^1 - N_a^2) - (N_b^1 - N_b^2) \quad (5)$$

For a WD 22 denoted r (rover), and a current reference station 36 c, the WD 22 maintains the integer solutions $N_{rc}^{ij}$ for the two satellites i and j. Eventually, when the WD 22 has transferred to a new reference station 36 n, the WD 22 needs to solve for $N_{rn}^{ij}$ instead. This will require some initialization time etc. Fortunately, given equation (5), there is a relation between $N_{rc}^{ij}$ and $N_{rn}^{ij}$ that can be exploited:

$$N_{rn}^{ij} = N_{rc}^{ij} + N_{cn}^{ij} = N_{rc}^{ij} + (N_c^i - N_c^j) - (N_n^i - N_n^j) \quad (6)$$

If $N_{cn}^{ij}=0$ for all satellite pairs i and j, which is true if $(N_c^i - N_c^j) = (N_n^i - N_n^j)$ for the new and current reference stations 36 for all satellite pairs, then the current and new reference stations 36 are said to be at the same integer ambiguity level.

The WD 22 may send, via the radio interface 82, a request message that includes spatial information, or the WD 22 will change the cell for monitoring the system information broadcast of GNSS RTK data.

The location node 17 may compute, via for example the processing circuitry 100 the double difference integer ambiguity solution for the pair of receivers associated with the current and new reference stations, as well as for pairs of satellites. In one embodiment, the location node 17 utilizes the carrier phase measurements from the two reference stations and for pairs of satellites.

In one embodiment, the location node 17 explicitly indicates whether two reference stations are on the same integer ambiguity level or not. It can be explicitly per pair of reference stations, or a general indication, indicating that all reference stations in an area are at the same integer ambiguity level.

Figure 17:
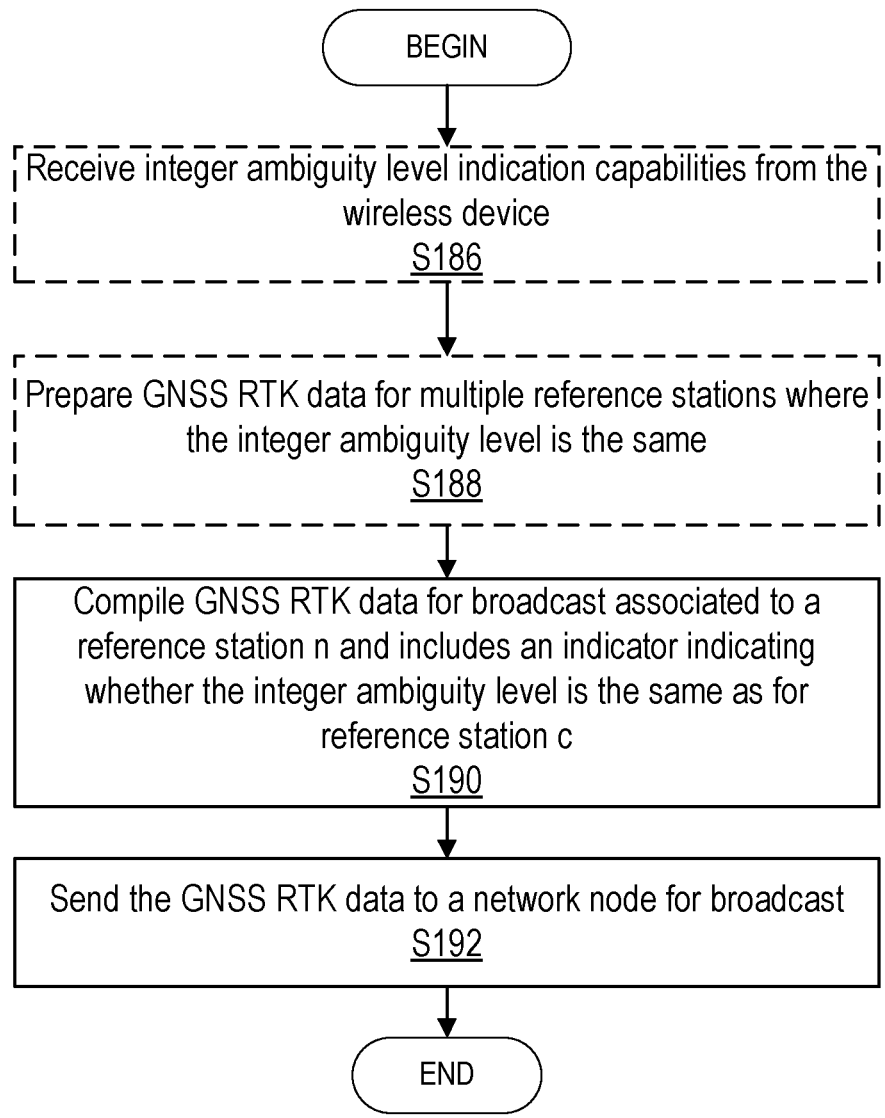
FIG. 17 is a flowchart of an alternative exemplary process in a network node for resolving integer ambiguity.

In another embodiment, the WD 22 obtains, via for example the radio interface 82, the integer ambiguity level indication via system information broadcast from a radio base station. The steps of a location server or a different location node 17 preparing the assistance data where reference stations have the same integer ambiguity level are described by FIG. 17. In particular, location node 17 such as via processing circuitry 100 and/or processor 102 and/or radio interface 98 and/or communication interface 96 is configured to receive (Block S186) integer ambiguity level indication capabilities from the WD 22, as described herein. Location node 17 such as via processing circuitry 100 and/or processor 102 and/or radio interface 98 and/or communication interface 96 is configured to prepare (Block S188) GNSS RTK data for multiple reference station, where the integer ambiguity level is the same, as described herein. Location node 17 such as via processing circuitry 100 and/or processor 102 and/or radio interface 98 and/or communication interface 96 is configured to compile (Block S190) GNSS RTK data for broadcast associated to a reference station n and includes an indicator indicating whether the integer ambiguity level is the same as for reference station c. Location node 17 such as via processing circuitry 100 and/or processor 102 and/or radio interface 98 and/or communication interface 96 is configured to send (Block S192) the GNSS RTK data to a network node 16 for broadcast, as described herein. In yet another embodiment, the WD 22 obtains, via for example the radio interface 82, the integer ambiguity level indication via subscription information, such as when the operator network is such that all reference stations are at the same integer ambiguity level.

In yet another embodiment, the WD 22 assumes that two reference stations are at the same integer ambiguity level and verifies that assumption by analysing whether the assumption matches the GNSS observations and assistance data after the switch to a new reference station.

According to the Third Generation Partnership Project (3GPP) Technical Standard (TS) 36.355 the following standards language is provided:

The IE GNSS-RTK-ReferenceStationInfo is used by the location server to provide the Earth-centered, Earth-fixed (ECEF) coordinates of the antenna reference point (ARP) of the stationary reference station 36 for which the GNSS-RTK-Observations assistance data are provided together with reference station 36 antenna description.

The parameters provided in information element (IE) GNSS-RTK-ReferenceStationInfo are used as specified for message type 1006, 1033 and 1032.

Also, the following computer code is provided where the bold may represent a modification according to the teachings described herein:

```
-- ASN1START
GNSS-RTK-ReferenceStationInfo-r15 ::= SEQUENCE {
    referenceStationID-r15              GNSS-ReferencestationID-r15,
    referenceStationIndicator-r15       ENUMERATED {physical, non-physical},
    antenna-reference-point-ECEF-X-r15  INTEGER (-137438953472..137438953471),
    antenna-reference-point-ECEF-Y-r15  INTEGER (-137438953472..137438953471),
    antenna-reference-point-ECEF-Z-r15  INTEGER (-137438953472..137438953471),
    antennaHeight-r15                   INTEGER (0..65535) OPTIONAL, -- Need ON
    antennaDescription-r15              AntennaDescription-r15 OPTIONAL, -- Need ON
    antenna-reference-point-unc-r15     AntennaReferencePointUnc-r15 OPTIONAL, -- Need ON
    physical-reference-station-info-r15 PhysicalReferenceStationInfo-r15 OPTIONAL, -- Cond NP
    ...,
    [[ equalIntegerAmbiguityLevel       EqualIntegerAmbiguityLevel OPTIONAL
    ]]
}
AntennaDescription-r15 ::= SEQUENCE {
    antennaDescriptor-r15               VisibleString (SIZE (1..256)),
    antennaSetUpID-r15                  ENUMERATED { non-zero } OPTIONAL, -- Need OP
    ...
}
AntennaReferencePointUnc-r15 ::= SEQUENCE {
    uncertainty-X-r15                   INTEGER(0..255),
    confidence-X-r15                    INTEGER(0..100),
    uncertainty-Y-r15                   INTEGER(0..255),
    confidence-Y-r15                    INTEGER(0..100),
    uncertainty-Z-r15                   INTEGER(0..255),
    confidence-Z-r15                    INTEGER(0..100),
    ...
}
PhysicalReferenceStationInfo-r15 ::= SEQUENCE {
    physicalReferenceStationID-r15      GNSS-ReferenceStationID-r15,
    physical-ARP-ECEF-X-r15             INTEGER (-137438953472..137438953471),
    physical-ARP-ECEF-Y-r15             INTEGER (-137438953472..137438953471),
    physical-ARP-ECEF-Z-r15             INTEGER (-137438953472..137438953471),
    physical-ARP-unc-r15                AntennaReferencePointUnc-r15 OPTIONAL, -- Need ON
    ...
}
EqualIntegerAmbiguityLevel::= CHOICE{
    allReferenceStations                BOOLEAN,
    referenceStationList                ReferenceStationList
}
ReferenceStationList ::= SEQUENCE (SIZE(1..16)) OF
    GNSS-ReferenceStationID-r15
-- ASN1STOP
```

The following field and explanations are provided:

| Conditional presence | Explanation |
| --- | --- |
| NP | The field is optionally present, need ON, if the referenceStationIndicator has the value 'non-physical'; otherwise it is not present. |

GNSS-RTK-ReferenceStationInfo field descriptions referenceStationID
The Reference Station ID is determined by the RTK service provider.
referenceStationIndicator
This field specifies a type of reference station. Enumerated value physical indicates a real, physical reference station; value non-physical indicates a non-physical or computed reference station.
antenna-reference-point-ECEF-X
This field specifies the antenna reference point X-coordinate in the World Geodetic System 1984 (WGS 84) datum.
Scale factor 0.0001 m; range ±13,743,895.3471 m.
antenna-reference-point-ECEF-Y
This field specifies the antenna reference point Y-coordinate in the World Geodetic System 1984 (WGS 84) datum.
Scale factor 0.0001 m; range ±13,743,895.3471 m.
antenna-reference-point-ECEF-Z
This field specifies the antenna reference point Z-coordinate in the World Geodetic System 1984 (WGS 84) datum.
Scale factor 0.0001 m; range ±13,743,895.3471 m.
antennaHeight
This field specifies the height of the Antenna Reference Point above the marker used in the survey campaign.
Scale factor 0.0001 m; range 0-6.5535 m.
antennaDescriptor
This field provides an ASCII descriptor of the reference station antenna using IGS naming convention. The descriptor can be used to look up model specific phase center corrections of that antenna.
antennaSetUpID
This field, if present, indicates that the standard IGS Model is not valid (≠ 0). If this field is absent the standard IGS Model is valid ('0 = Use standard IGS Model').
antenna-reference-point-unc
This field specifies the uncertainty of the ARP coordinates.
uncertainty-X, uncertainty-Y, and uncertainty-Z correspond to the encoded high accuracy uncertainty of the X, Y, and Z-coordinate, respectively, as defined in 3GPP TS 23.032. confidence-X, confidence-Y, and confidence-Z corresponds to confidence as defined in 3GPP TS 23.032.
physical-reference-station-info
This field provides the earth-centered, earth-fixed (ECEF) coordinates of the antenna reference point (ARP) for the real (or "physical") reference station used.
This field may be used in case of the non-physical reference station approach to allow the target device to refer baseline vectors to a physical reference rather than to a non-physical reference without any connection to a physical point.
physicalReferenceStationID
This field specifies the station ID of a real reference station, when the referenceStationIndicator has the value 'non-physical'.
physical-ARP-ECEF-X
This field specifies the antenna reference point X-coordinate in the World Geodetic System 1984 (WGS 84) datum.
Scale factor 0.0001 m; range ±13,743,895.3471 m.
physical-ARP-ECEF- Y
This field specifies the antenna reference point Y-coordinate in the World Geodetic System 1984 (WGS 84) datum.
Scale factor 0.0001 m; range ±13,743,895.3471 m.
physical-ARP-ECEF-Z
This field specifies the antenna reference point Z-coordinate in the World Geodetic System 1984 (WGS 84) datum.
Scale factor 0.0001 m; range ±13,743,895.3471 m.
physical-ARP-unc
This field specifies the uncertainty of the ARP coordinates.
equalIntegerAmbiguityLevel (in accordance with the present disclosure)
This field specifies the integer ambiguity level of this reference station in relation to other reference stations. Either, the target device can assume that it is the same for all reference stations, or cannot assume that it is the same as other reference stations, or the target device is provided with a list of reference stations for which the integer ambiguity level can be assumed to be the same.

According to one aspect, a location node 17 configured to communicate with a wireless device (WD 22), includes a radio interface 98 and/or comprising processing circuitry 100 configured to: receive spatial information from the WD 22 and determine, based at least in part on the spatial information, whether the WD 22 is to be configured to obtain real time kinematic (RTK) data from a subsequent reference station 36 that is different from a current reference station 36 providing RTK data to the WD 22. The location node 17 is further configured to analyze an integer ambiguity level of the subsequent reference station 36 and the current reference station 36 and transmit an indication of whether the WD 22 is to use an integer ambiguity level for the subsequent reference station 36 that is the same as an integer ambiguity level for the current reference station.

According to this aspect, in some embodiments, the location node 17, radio interface 98 and/or processing circuitry 100 is further configured to receive from the WD 22 supported integer ambiguity level indication capabilities of the WD 22. In some embodiments, the indication includes an indication that the current and subsequent reference station 36 have a same integer ambiguity level.

According to another aspect, a method implemented in a location node 17 includes receiving spatial information from the WD 22, determining, based at least in part on the spatial information, whether the WD 22 is to be configured to obtain real time kinematic (RTK) data from a subsequent reference station 36 that is different from a current reference station 36 providing RTK data to the WD 22, and analyzing an integer ambiguity level of the subsequent reference station 36 and the current reference station. The method further includes transmitting an indication of whether the WD 22 is to use an integer ambiguity level for the subsequent reference station 36 that is the same as an integer ambiguity level for the current reference station.

According to this aspect, in some embodiments the method further includes receiving from the WD 22 integer ambiguity level indication capabilities of the WD 22. In some embodiments, the indication includes an indication that the current and subsequent reference station 36 have a same integer ambiguity level.

According to yet another aspect, a wireless device (WD 22) configured to communicate with a location node 17 includes a radio interface 82 and/or processing circuitry 84 configured to transmit spatial information to the location node 17, receive an integer ambiguity level indication indicating whether the WD 22 is to use a same integer ambiguity level for a subsequent reference station 36 as is used for a current reference station, and select an integer ambiguity level based on the indication.

According to this aspect, in some embodiments the indication is received in a system broadcast message or subscription information. In some embodiments, the WD 22, radio interface 82 and/or processing circuitry 84 is further configured to verify an assumption that the subsequent reference station 36 and current reference station 36 have a same integer ambiguity level.

According to another aspect, a method implemented in a wireless device (WD 22) includes transmitting spatial information to the location node 17, receiving an integer ambiguity level indication indicating whether the WD 22 is to use a same integer ambiguity level for a subsequent reference station 36 as is used for a current reference station, and selecting an integer ambiguity level based on the indication.

According to this aspect, in some embodiments, the indication is received in a system broadcast message or subscription information. In some embodiments, the method further includes verifying an assumption that the subsequent reference station 36 and current reference station 36 have a same integer ambiguity level.

The core of the solution is a signaling framework for providing indication of the same integer ambiguity levels between reference stations to facilitate a quick transfer of the integer ambiguity solution when moving from one current reference station 36 to a new reference station.

SOME EXAMPLES

Example A1. A network node 16 configured to communicate with a wireless device 22 (WD 22) and at least one reference station 36, the network node 16 configured to, and/or comprising a radio interface 62 and/or comprising processing circuitry 68 configured to:
  receive spatial information from the WD 22;
  determine, based at least in part on the spatial information, whether the WD 22 is to be configured to obtain real time kinematic (RTK) data from a subsequent reference station 36 that is different from a current reference station providing RTK data to the WD 22;
  analyze an integer ambiguity level of the subsequent reference station 36 and the current reference station 36; and
  transmit an indication of whether the WD 22 is to use an integer ambiguity level for the subsequent reference station 36 that is the same as an integer ambiguity level for the current reference station 36.

Example A2. The network node 16 of Example A1, wherein the network node 16, radio interface 62 and/or processing circuitry 68 is further configured to receive from the WD 22 supported integer ambiguity level indication capabilities of the WD 22.

Example A3. The network node 16 of Example A1, wherein the indication includes an indication that the current and subsequent reference station have a same integer ambiguity level.

Example B1. A method implemented in a network node 16, the method comprising:
  receiving spatial information from the WD 22;
  determining, based at least in part on the spatial information, whether the WD 22 is to be configured to obtain real time kinematic (RTK) data from a subsequent reference station 36 that is different from a current reference station providing RTK data to the WD 22;
  analyzing an integer ambiguity level of the subsequent reference station 36 and the current reference station 36; and
  transmitting an indication of whether the WD 22 is to use an integer ambiguity level for the subsequent reference station 36 that is the same as an integer ambiguity level for the current reference station 36.

Example B2. The method of Example B 1, further comprising receiving from the WD 22 integer ambiguity level indication capabilities of the WD 22.

Example B3. The method of Example B 1, wherein the indication includes an indication that the current and subsequent reference station 36 have a same integer ambiguity level.

Example C1. A wireless device 22 (WD 22) configured to communicate with a network node 16 and at least one reference station, the WD 22 configured to, and/or comprising a radio interface 82 and/or processing circuitry 84 configured to:
  transmit spatial information to the network node 16;
  receive an integer ambiguity level indication indicating whether the WD 22 is to use a same integer ambiguity level for a subsequent reference station 36 as is used for a current reference station 36; and
  select an integer ambiguity level based on the indication.

Example C2. The WD 22 of Example C1, wherein the indication is received in a system broadcast message or subscription information.

Example C3. The WD 22 of Example C1, wherein the WD 22, radio interface 82 and/or processing circuitry 84 is further configured to verify an assumption that the subsequent reference station 36 and current reference station 36 have a same integer ambiguity level.

Example D1. A method implemented in a wireless device 22 (WD 22), the method comprising:
  transmitting spatial information to the network node 16;
  receiving an integer ambiguity level indication indicating whether the WD 22 is to use a same integer ambiguity level for a subsequent reference station as is used for a current reference station 36; and
  selecting an integer ambiguity level based on the indication.

Example D2. The method of Example D1, wherein the indication is received in a system broadcast message or subscription information.

Example D3. The method of Example D1, further comprising verifying an assumption that the subsequent reference station 36 and current reference station 36 have a same integer ambiguity level.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| E-SMLC | Evolved-Serving Mobile Location Centre |
| GNSS | Global Navigation System |
| RTK | Real Time Kinematic |
| RMS | Root Mean Square |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A location node configured to communicate with a wireless device, the location node comprising:
   processing circuitry configured to:
   receive spatial information, the spatial information indicating the wireless device is monitoring a system information broadcast in a spatial region associated with a cell identifier;
   determine the wireless device relationship between a first reference station and a second reference station based at least in part on the spatial information;
   compare a first integer ambiguity level of the first reference station with a second integer ambiguity level of the second reference station, the second reference station corresponding to a current reference station of the wireless device; and
   transmit an indication of an applicability of the first integer ambiguity level of the first reference station to the second integer ambiguity level of the second reference station for position estimation, the indication being based on the comparison of the first integer ambiguity level with the second integer ambiguity level.

2. The location node of claim 1, wherein the indication indicates that the first integer ambiguity level of the first reference station is transferable to the second reference station.

3. The location node of claim 1, wherein the indication indicates that the first integer ambiguity level of the first reference station is not transferable to the second reference station.

4. The location node of claim 1, wherein the spatial information indicates a cell identifier.

5. The location node of claim 1, wherein the indication to the wireless device indicates for the wireless device to monitor real time kinematics, RTK, signaling from the second reference station instead of the first reference station.

6. The location node of claim 1, wherein the first reference station corresponds to a first node with a known first physical position and first antenna configuration that has a first global navigation satellite system receiver for measuring signals from at least one satellite; and
   the second reference station corresponds to a second node with a known second physical position and second antenna configuration that has a second global navigation satellite system receiver for measuring signals from at least one satellite.

7. The location node of claim 1, wherein the indication is transmitted to a network node serving the wireless device for broadcasting to the wireless device.

8. A wireless device configured to communicate with a location node, the wireless device comprising:
   processing circuitry configured to:
   transmit spatial information, the spatial information indicating the wireless device is monitoring a system information broadcast in a spatial region associated with a cell identifier;
   receive an indication of an applicability of a first integer ambiguity level of a first reference station to a second integer ambiguity level of a second reference station, the indication being based at least in part on the spatial information; and
   estimate a position of the wireless device based at least in part on the indication.

9. The wireless device of claim 8, wherein the indication indicates that the first integer ambiguity level of the first reference station is transferable to the second reference station.

10. The wireless device of claim 8, wherein the indication indicates that the first integer ambiguity level of the first reference station is not transferable to the second reference station.

11. The wireless device of claim 8, wherein the spatial information indicates a cell identifier.

12. The wireless device of claim 8, wherein the first reference station corresponds to a first node with a known first physical position and first antenna configuration that has a first global navigation satellite system receiver for measuring signals from at least one satellite; and
   the second reference station corresponds to a second node with a known second physical position and second antenna configuration that has a second global navigation satellite system receiver for measuring signals from at least one satellite.

13. The wireless device of claim 8, wherein the processing circuitry is further configured to determine carrier phase of the second reference station, the estimate of the position being based at least in part on the determined carrier phase of the second reference station.

14. The wireless device of claim 8, wherein the wireless device is reassigned from the first reference station to the second reference station.

15. The wireless device of claim 14, wherein the indication indicates for the wireless device to monitor real time kinematics, RTK, signaling from the second reference station instead of the first reference station.

16. A method for a location node that is configured to communicate with a wireless device, the method comprising:
   receiving spatial information, the spatial information indicating the wireless device is monitoring a system information broadcast in a spatial region associated with a cell identifier;
   determining the wireless device relationship between a first reference station and a second reference station based at least in part on the spatial information;
   comparing a first integer ambiguity level of the first reference station with a second integer ambiguity level of the second reference station, the second reference station corresponding to a current reference station of the wireless device; and
   transmitting an indication of an applicability of the first integer ambiguity level of the first reference station to the second integer ambiguity level of the second reference station for position estimation, the indication being based on the comparison of the first integer ambiguity level with the second integer ambiguity level.

17. The method of claim 16, wherein the indication indicates that the first integer ambiguity level of the first reference station is transferable to the second reference station.

18. The method of claim 16, wherein the indication indicates that the first integer ambiguity level of the first reference station is not transferable to the second reference station.

19. The method of claim 16, wherein the spatial information indicates a cell identifier.

20. The method of claim 16, wherein the indication to the wireless device indicates for the wireless device to monitor real time kinematics, RTK, signaling from the second reference station instead of the first reference station.

21. The method of claim 16, wherein the first reference station corresponds to a first node with a known first physical position and first antenna configuration that has a first global navigation satellite system receiver for measuring signals from at least one satellite; and
   the second reference station corresponds to a second node with a known second physical position and second antenna configuration that has a second global navigation satellite system receiver for measuring signals from at least one satellite.

22. The method of claim 16, wherein the indication is transmitted to a network node serving the wireless device for broadcasting to the wireless device.

23. A method for a wireless device that is configured to communicate with a location node, the method comprising:
   transmitting spatial information, the spatial information indicating the wireless device is monitoring a system information broadcast in a spatial region associated with a cell identifier;
   receiving an indication of an applicability of a first integer ambiguity level of a first reference station to a second integer ambiguity level of a second reference station, the indication being based at least in part on the spatial information; and
   estimating a position of the wireless device based at least in part on the indication.

* * * * *

UNITED STATES PATENT AND TRADEMARK OFFICE
CERTIFICATE OF CORRECTION

PATENT NO. : 12,174,303 B2
APPLICATION NO. : 17/765192
DATED : December 24, 2024
INVENTOR(S) : Gunnarsson et al.

Page 1 of 1

It is certified that error appears in the above-identified patent and that said Letters Patent is hereby corrected as shown below:

In the Specification

In Column 1, Line 57, delete "multilateration" and insert -- multilateration. --, therefor.

In Column 2, Line 21, delete "$\phi=\rho-I+Tr+c(b_{Rx}-b_{Sat})+N\lambda+\epsilon\phi$" and insert -- $\phi=\rho-I+Tr+c(b_{Rx}-b_{Sat})+N\lambda+\epsilon_\phi$ --, therefor.

In Column 3, Line 15, delete "reference. This is stations," and insert -- reference stations, --, therefor.

In Column 8, Line 1, delete "equipped" and insert -- equipment --, therefor.

In Column 11, Line 8, delete "and or" and insert -- and/or --, therefor.

In Column 19, Line 58, delete "h" and insert -- b --, therefor.

In Column 25, Line 56, delete "B 1," and insert -- B1, --, therefor.

In Column 25, Line 59, delete "B 1," and insert -- B1, --, therefor.

Signed and Sealed this
Twenty-first Day of October, 2025

John A. Squires
*Director of the United States Patent and Trademark Office*